Oct. 2, 1962     G. DIRKS     3,056,955
MEANS FOR THE VISUAL INDICATION OF NUMBERS AND OTHER INFORMATION
Original Filed May 25, 1954     2 Sheets-Sheet 1

INVENTOR.
Gerhard Dirks
BY Michael S. Striker
Attorney

Oct. 2, 1962     G. DIRKS     3,056,955
MEANS FOR THE VISUAL INDICATION OF NUMBERS AND OTHER INFORMATION
Original Filed May 25, 1954     2 Sheets-Sheet 2

INVENTOR.
Gerhard Dirks
BY
Michael S. Striker
Attorney

3,056,955
MEANS FOR THE VISUAL INDICATION OF NUMBERS AND OTHER INFORMATION

Gerhard Dirks, Frankfurt am Main, Germany
(12120 Edgecliff Place, Los Altos Hills, Calif.)
Continuation of application Ser. No. 432,296, May 25, 1954. This application June 29, 1959, Ser. No. 823,435
Claims priority, application Germany Oct. 1, 1948
5 Claims. (Cl. 340—324)

This invention relates to the visual indication of numbers and other information and has especial though not exclusive reference to the visual indication of information contained in a storage means, such as, for example, a magnetic record means.

This application is a continuation of my application Serial No. 432,296, filed May 25, 1954, entitled "Means for the Visual Indication of Numbers and Other Information," and now abandoned, which, in turn, is a continuation-in-part of application Serial No. 101,032, filed June 24, 1949, now abandoned.

The invention will find use, for example, in making visible the result of a computation in an electronic digital computer. Another use of the invention will be in making visible the amount recorded on operation of a cash register or like machine. Still other uses will be found for the invention.

The invention relies for its usefulness on the persistence of human vision whereby what is actually a rapidly intermittent indication is seen by the eye as a continuous indication.

According to the invention a series of characters in each of a number of denominations is caused to pass repeatedly behind a viewing aperture at a high speed and selected characters are illuminated as they pass such aperture, the repeated illumination of the selected characters being seen by the eye as a number, word or the like continuously illuminated.

In some forms of the invention, the several characters are on an optically-sensitive rotatable disc, those for the successive denominations being in successive sectors of the disc, off-set from each other radially, so as to pass behind a radially-disposed viewing aperture in the respective denominational positions. In some other forms of the invention the characters are arranged in rows on a rotatable cylinder and are adapted to be illuminated selectively as they pass behind a viewing aperture.

In all cases the optically-sensitive carrier member for characters may be associated with a magnetic record means moving in synchronism with it, the illumination of the various characters being controlled selectively by the sensing of signals on the record means.

The optically-sensitive member may carry two sets of characters, one for direct and one for complementary digit values, and the sensing means may include switching means for making either of said sets of values operative according to whether digit value signals sensed are greater or less than zero.

In order that the present invention may be readily carried into effect, it will now be described with reference to the accompanying drawing, wherein.

Figure 1:
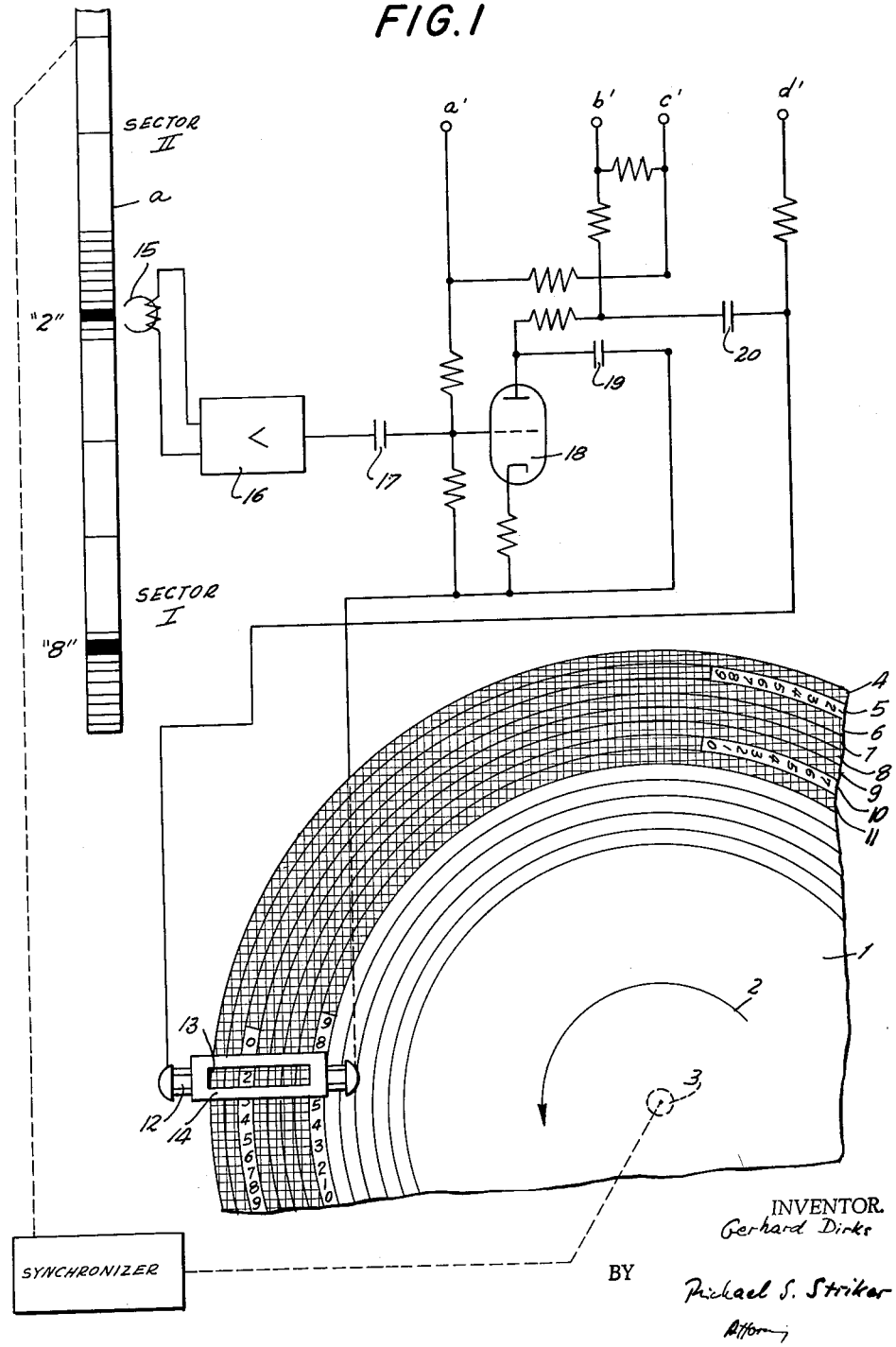
FIG. 1 is a schematic diagram of an embodiment of the apparatus of the present invention showing a part of an optically sensitive disc and a wiring diagram for the flashing of signals onto said disc.

Referring to FIG. 1, there is a portion of a stroboscopic indicating disc 1, which is rotatable in the direction of the arrow 2 around axis 3. The disc 1 may be of any suitable diameter according to the maximum number of denominations which are to be handled. The disc 1 is provided with optically sensitive rows 4, 5, 6, 7, 8, 9, 10 and 11, which are arranged as concentric rings, each of these rings containing in a certain sector the digit value characters 0–9 as optically sensitive characters spaced apart in the direction of rotation of the disc. The characters in the outer rings 4–7 are in the reverse order compared with those in the inner rings 8–11. The concentric rings are arranged in such a way that the digits 0–9 in the innermost ring of each of the sets 4–7 and 8–11 are situated in one sector, in the next outer ring they are in the next sector, in the third ring they are in the third sector and so on to the outermost ring, so that groups of digits in the different sections pass behind an aperture or slot 13 in succession.

Combined with the rotatable disc 1 is a stroboscopic flash tube 12 behind the disc aligned with the slot 13 in a mask or blind 14, the width of which slot is only slightly greater than the height of the digit value characters. In the example shown in FIG. 1, the digit "2" is visible in the slot 13 of the mask 14 in the optically-sensitive ring 6, representing the penultimate denomination of the number "028," for example.

The slot 13 in combination with the flash tube 12 has the task of indicating in a stroboscopic way the side-by-side digits of the different denominations of numbers, beginning from the last denomination. Various means may be employed for actuating the stroboscopic devices from a computer, e.g. from a storage or record means, it being unnecessary to transform signals sensed from such a record means before they can be passed to the indicating means.

In FIG. 1 there is shown a track "a" of a magnetizable record means, such as is explained in detail in application Serial No. 101,032, filed on June 29, 1949.

The track "a" has recorded thereon magnetic signals having the meaning of "028," that is, in the first ten fields of sector I a magnetic signal is contained in field 8 and in the fields of sector II a signal is contained in field 2.

The disc-like record means also contains in each of the concentric rings 4–11 the optical characters of the digits 0–9. They are arranged in such a way that the fields in track "a" containing the magnetic signals correspond in angular position to the fields containing the corresponding optical characters of the digits 0–9. If the magnetic layer for the record means and the optical film layer for the stroboscopic indicating are deposited on the same glass disc 1 or the like, comprising a rotating record means, the functional connection between computing and indicating is especially evident. In this case the track "a" consists of an imaginary concentric ring on the magnetic layer of the disc 1, which ring is sensed by a sensing-head 15 such as the head 15 shown in FIG. 1. The field "2" in track "a" corresponds to the digit 2 in the optically-sensitive ring 6 in such a way, that at the instant when the magnetic field "2" is below the gap of the sensing head 15, the shape of digit "2" on the optical sensitive ring 6 is within the slot 13 of the mask or blind 14. In consequence of the width of the slot 13, only one digit in each concentric row of characters can be seen at any one time, in the example illustrated, digit "2."

Instead of the magnetic record means and optically-sensitive means being on the same carrier member (disc 1) they could in other cases (as shown in FIG. 1) be on separate members moving in synchronism with each other.

As the optically-sensitive layer is black and as only the rows of characters of the digits 0–9 within the concentric rings 4–11 are transparent, only the shape of the digit "2" will be visible if and when the stroboscopic flash lights the optical layer from below at the instant when the shape of digit "2" is behind the slot 13 of the mask 14. The concentric ring 6 corresponds to the sector II of the track "a," and similarly the ring 7, with the digit rows 0–9 corresponds to sector I of said track. The moment in which the flash is to light within the discharge lamp 12 is controlled by the sensing head 15 in circuit with an amplifier 16, a coupling-capacitor 17 and a discharge tube 18. The discharge tube 18 is caused to conduct and to discharge capacitors 19 and 20 through the discharge flashlight lamp 12. In one convenient arrangement the respective terminals of the circuit for illuminating the stroboscopic lamp had the following voltages:

$$a'=-20, b'=300, c'=0, \text{ and } d'=2000$$

As this flashlight lasts only for a few microseconds, with the intensity of light, repeating this flash at every rotation of the record means (for example a 50 times per sec.) the shape of the digit "2" seems to stand in the slot 13 as a continuous image, although the disc is rotating and the light flashing at e.g. 3000 times per minute. During each rotation of the disc this flashing will take place when the character of digit "2" is passing behind the slot 13 of the mask, i.e. in the same instant when the magnetic signal "2" on the record means passes below the gap of the sensing head 15.

In the concentric ring 6, the shapes of the digits 0–9 are arranged within sector II of the record means and the corresponding part of the optical sensitive layer of the stroboscopic disk. This concentric ring is set off by one denomination, i.e. by one concentric ring, toward the exterior compared with the concentric ring 7. Thus, at each rotation of the disc a flashlight is effected by the same means (sensing-head 15, amplifier 16, coupling-capacitor 17, discharge tube 18, capacitors 19 and 20, flashlight lamp 12, slot 13 and mask 14) repeatedly at that instant, when field "2" of the sector II with its magnetic signal "2" is passing below the slot of the sensing head 15.

As in this case the row of characters for the digits 0–9 in sector II is set off by one concentric ring toward the exterior, the shape of the digit "2" appears one denomination left from the digit "8" within the slot 13 of the mask 14 and because of the persistence of human vision is seen as a continuous image, so that within the slot 13 the number "28" is indicated although the digits 2 and 8 are not illuminated simultaneously.

It is obvious that with the same sensing head and flashlight circuit, as many denominations can be indicated within the slot 13 of the mask 14 at each rotation of the record means and stroboscopic disc, as there are concentric rings provided with set-off rows of the optically-sensitive characters 0–9. The indicating of a 16-denominations-number requires 16 concentric rings, with the characters all in the same order which rings correspond, from the innermost to the outermost rings to 16 successive sectors I–XVI of the record means, whereby the row of characters of the digits "0–9" for the last denomination (corresponding to sector I of the record means) is arranged within the innermost ring of the optical layer; the row of characters of the digits "0–9" for the last but one (penultimate) denomination (corresponding to sector II of the record means) is arranged within the second concentric ring of the optical layer; the row of characters of the digits "0–9" for the ante-penultimate denomination (corresponding to sector III of the record means) is arranged within the third concentric ring from the interior on the optical layer, and so on.

Figures 2, 3, 4:
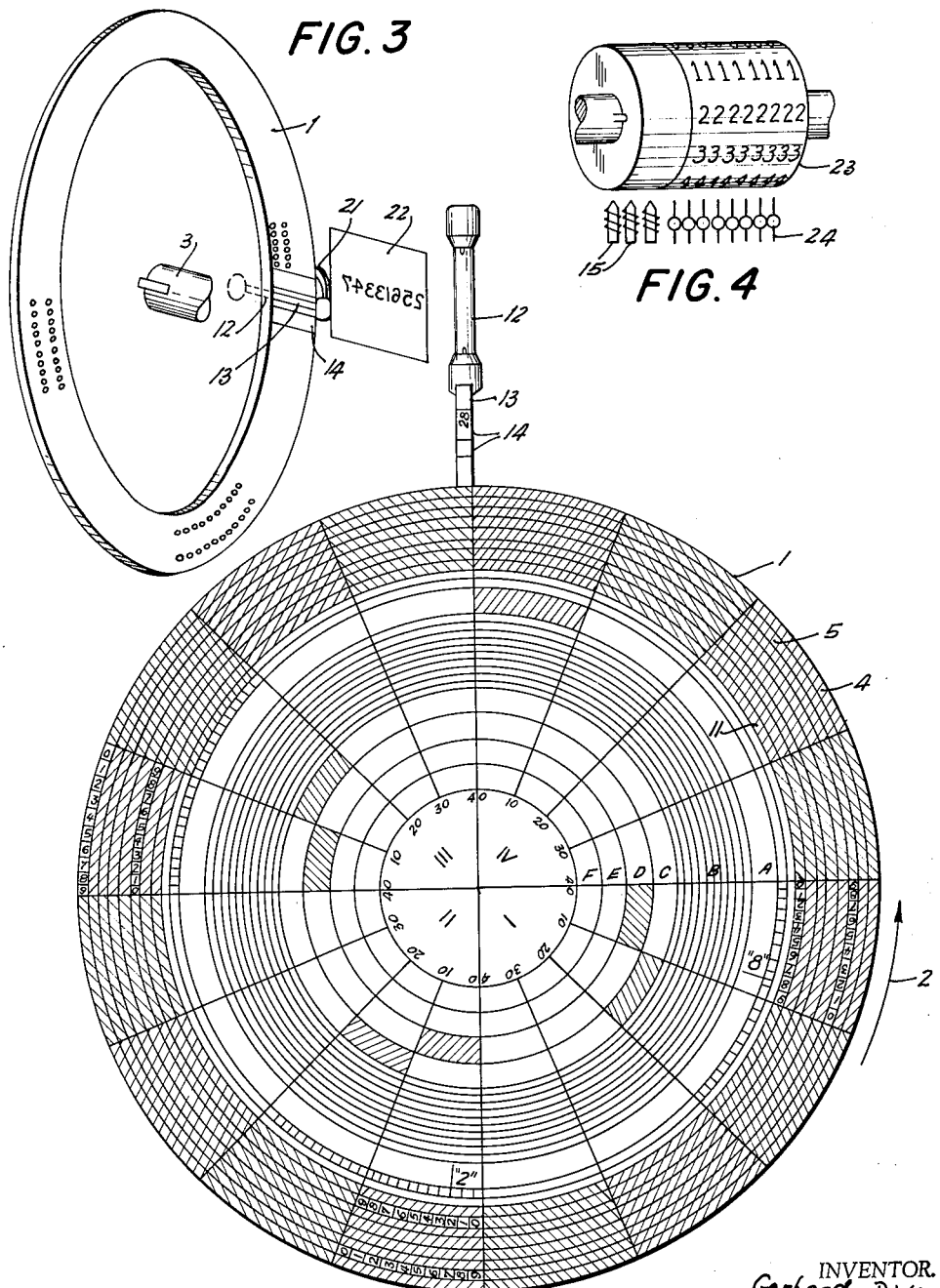
FIG. 2 is a schematic diagram of an embodiment of a portion of the apparatus of the present invention showing a magnetic and optical stroboscopic disc provided with rows of characters for direct and complementary digit values.
FIG. 3 is a perspective view of an embodiment of an arrangement for obtaining an enlarged representation of the stroboscopically indicated characters of the apparatus of the present invention.
FIG. 4 is a perspective view of an embodiment of means for the parallel operating of stroboscopic indicating means in which the various denominations are indicated simultaneously and not successively.

Referring to FIG. 2, there is shown a combined magnetic and optical sensitive disc 1, the center part a, b, c, d, e, and f, of which comprises a magnetic record means such as is explained in detail in application Serial No. 101,032, filed June 24, 1949. The magnetic area is divided into sectors I, II, and III representing successive denominations of a number, with at least one extra area for command signals and to allow for operating time. The outer part of the disc, which is coated with an optically-sensitive material, is divided into similar sectors each of which contains a set of rows of digit value characters 0–9 and a second set of rows of characters 9–0, so that a value may be indicated either as a direct value by the one set of characters 0–9 or as a complementary value by the other set of characters 9–0. The disc rotates about its axis and its optically-sensitive layer passes an indicating means comprising the flash tube 12 and the slot 13 of a mask 14, so that, at a time when a digit value character is below the slot 13 and at the same time a magnetic signal for that value is below the slot of a sensing head, the value is indicated by the stroboscopic means.

When using the combined disc shown in FIG. 2, the mask, through which the value is indicated, is movable between two positions, in one of which it cooperates with the set of rows of digit characters 0–9 and in the other of which it cooperates with the set of rows of digit value characters 9–0, so that in the one position a number may be indicated as a direct value and in the other position as a complementary value. The moving of the mask between these two positions is controlled by signals on the record means in dependence on whether the number to be indicated is greater or lower than zero. In one convenient arrangement the mask is mounted on slides for movement between its two positions and may be urged to one such position by a spring and brought to the other position by a magnetic means such as a solenoid operated by a signal on the record means. The mask may include a movable portion adapted to cover the denominations where otherwise a zero character would be indicated. It is obvious also that zero-signals can either be indicated by a lighted zero on the optically-sensitive disc or by the suppressing of the flashing behind those signals. It is obvious also, that within such concentric rings commas or other signs or commands can be shown, so that indicated numbers can be subdivided and separated into denominations in any desired way in dependence on the signals controlling the flashing of the flashing stroboscopic lamp 12.

The movable part of the mask mentioned above can be used both with an arrangement indicating direct values only and with a means for indicating direct or complementary values selectively. In the latter case it will be transferred from one position to the other with the mask as a whole.

In cases where the indication of the values is small, for example where the disc is divided into a large number of denominations, means may be provided for enlarging the indication. One such means is shown in FIG. 3 and comprises a lens 21 in front of the mask 14 by means of which the indicated value is projected and shown on a screen 22 as an enlarged indication.

An alternative indicating arrangement is shown in FIG. 4. The arrangement of FIG. 4 is suitable for use in a cash register, where the digit values are carried on a rotating cylinder 23, being in parallel rows, and behind each circumferential path is a stroboscopic lamp 24. As the cylinder 23 rotates in synchronism with the signals on a record means representing the various characters to be indicated, a stroboscopic lamp is flashed at the moment at which in any one denomination the digit value character to be indicated passes between the lamp and the slot in the mask. For example, if the number 323 is to be indicated, the stroboscopic lamp in the first circumferential path will be flashed as the digit value 3 appears opposite the mask, the stroboscopic lamp in the second circumferential path will be flashed when the digit value 2 appears opposite the mask, and likewise in the third circumferential path the stroboscopic lamp will be flashed when the digit value 3 appears opposite the slot in the mask. These various high speed intermittent flashings will be perceived by a human eye as a continuous image 323. This form of the stroboscopic indicating means may of course be used for any other purpose than in a cash register. In the same way, instead of the characters on the cylinder being numbers they could be letters of any alphabet, so that instead of a number being indicated stroboscopically a word or words may be indicated. In the arrangement shown, a magentic record means is provided at the left hand end of the clyinder as a magnetic drum and signals thereon are sensed by the signal heads 15, the sensing of these signals determine which of the stroboscopic lamps 24 shall be flashed at any particular time.

What I claim is:

1. Apparatus for instantaneously visually indicating characters represented by magnetic signals and comprising, in combination, a rotary magnetizable record disc having a plurality of sets of magnetizable areas, said sets being located consecutively spaced in the direction of rotation of said record disc in sectors of said record disc, the areas of each set of areas being equally spaced from the axis of rotation of said record disc, the areas of each set being respectively associated with the same set of characters or digits, each area being adapted to record a magnetic signal for representing a selected character of the respective set; stationary sensing means cooperating with said record disc for consecutively and serially sensing at each revolution of the same a series of magnetic signals recorded on said rotary record disc, each sensed signal of said series being selected from one of said sets of areas so that said series of sensed magnetic signals correspond to a selected set of characters; a rotary indicating member rotating in sychronism with said rotary record disc and carrying a plurality of said sets of characters in viewable form spaced in the direction of rotation, said sets of characters moving during rotation of said rotary member along parallel circular paths; and at least one stationary stroboscopic lamp for lighting a part of said rotary member extending across said parallel circular paths, circuit means, said stroboscopic lamp being electrically connected by said circuit means to said sensing means so as to be actuated by said sensing means whenever the same sense a magnetic signal so that during rapid rotation of said rotary record means and of said rotary member, a series of characters appears to the human eye simultaneously illuminated on said part of said rotary member in adjacent positions for simultaneous reading while the corresponding magnetic signals are successively sensed on said rotary record means.

2. Apparatus for instantaneously visually indicating characters represented by magnetic signals and comprising, in combination, a rotary magnetizable record disc having a plurality of sets of magnetizable areas, said sets being located consecutively spaced in the direction of rotation of said record disc in sectors of said record disc, the areas of each set of areas being equally spaced from the axis of rotation of said record disc, the areas of each set being respectively associated with the same set of characters or digits, each area being adapted to record a magnetic signal for representing a selected character of the respective set; stationary sensing means cooperating with said record disc for consecutively and serially sensing at each revolution of the same a series of magnetic signals recorded on said rotary record disc, each sensed signal of said series being selected from one of said sets of areas so that said series of sensed magnetic signals correspond to a selected set of characters; a rotary indicating annulus rotating in synchronism with said rotary record disc and carrying a plurality of said sets of characters in viewable form spaced in the direction of rotation, said sets of characters being spaced from each other in radial and circumferential directions and moving during rotation of said rotary annulus along parallel concentric circular paths; and at least one stationary stroboscopic lamp for lighting a part of said rotary annulus extending across said parallel concentric circular paths circuit means, said stroboscopic lamp being electrically connected by said circuit means to said sensing means so as to be actuated by said sensing means whenever the same sense a magnetic signal so that during rapid rotation of said rotary record disc and of said rotary annulus, a series of characters appears to the human eye simultaneously illuminated for simultaneous reading on said part of said rotary annulus in adjacent positions while the corresponding magnetic signals are successively sensed on said rotary record disc.

3. An apparatus as claimed in claim 1 wherein said characters are digits and wherein said areas correspond to denominational positions of the digits, said sets of characters in viewable form including a group of digits representing direct values and another group of digits representing complementary values; and including means controlled by a signal on said rotary record disc and controlling said stroboscopic lamp for selectively displaying said groups of digits.

4. Apparatus for instantaneously visually indicating characters represented by magnetic signals, comprising, in combination, a rotary magnetizable record medium having a plurality of magnetic signals representing selected characters recorded thereon; sensing means cooperating with said magnetizable record medium for sensing magnetic signals recorded thereon; a rotary indicating member rotating in synchronism with said rotary record medium and having a plurality of readable characters thereon, said readable characters corresponding to those represented by said magnetic signals; light means positioned in proximity with the readable characters on said rotary indicating member for lighting a part of the said rotary indicating member; and light control means connected between said sensing means and said light means in a manner whereby said light means is energized by said light control means upon the sensing of a magnetic signal on said magnetizable record medium by said sensing means thereby providing an instantaneous visual indication of a character on said rotary indicating member corresponding to the sensed magnetic signal.

5. Apparatus for instantaneously visually indicating characters represented by magnetic signals, comprising, in combination, a rotary magnetizable record medium having a plurality of magnetic signals representing selected characters recorded thereon; sensing means cooperating with said magnetizable record medium for sensing magnetic signals recorded thereon; a rotary indicating member rotating in synchronism with said rotary record medium and having a plurality of readable characters thereon, said readable characters corresponding to those represented by said magnetic signals and being located in concentric rings of the rotary indicating member; light means positioned in proximity with the readable characters on said rotary indicating member for lighting a part of the said rotary indicating member; and light control means connected between said sensing means and said light means in a manner whereby said light means is energized by said light control means upon the sensing of a magnetic signal on said magnetizable record medium by said sensing means thereby providing an instantaneous visual indication of a character on said rotary indicating member corresponding to the sensed magnetic signal.

References Cited in the file of this patent

UNITED STATES PATENTS

| | | |
|---|---|---|
| 2,666,911 | Reynolds | Jan. 19, 1954 |
| 2,714,841 | Demer et al. | Aug. 9, 1955 |